Dec. 23, 1930.     W. H. MORGAN     1,785,743
CANE CUTTER
Filed Dec. 19, 1924     2 Sheets-Sheet 2
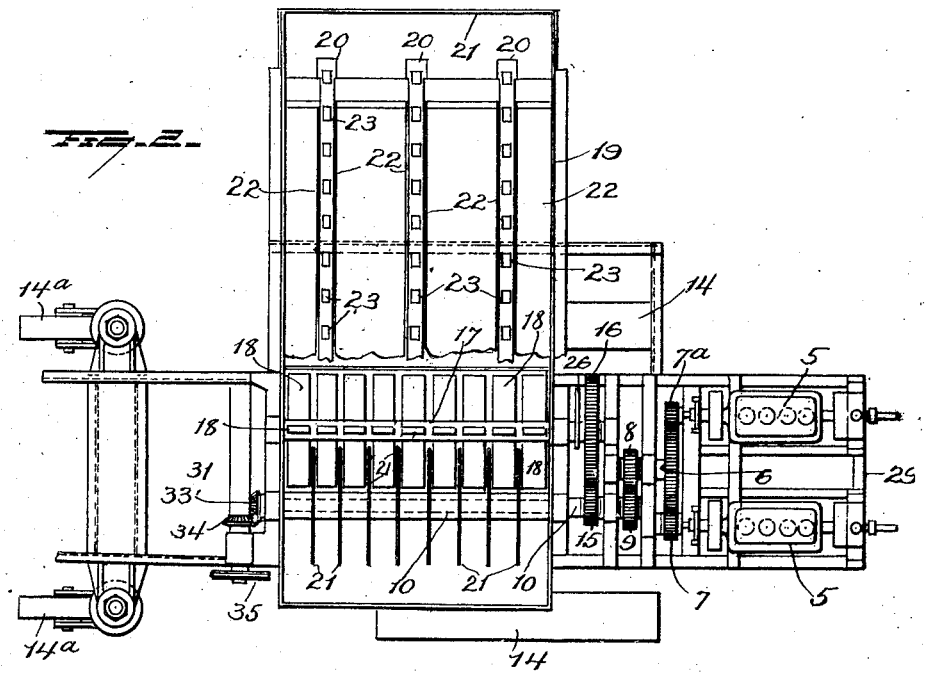
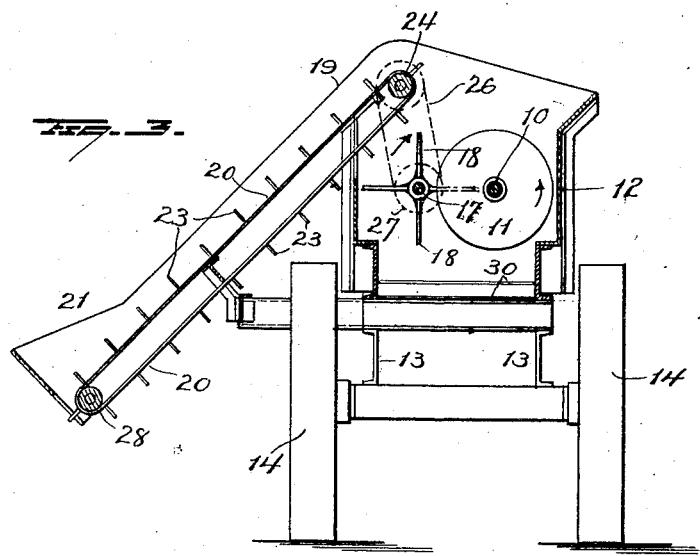

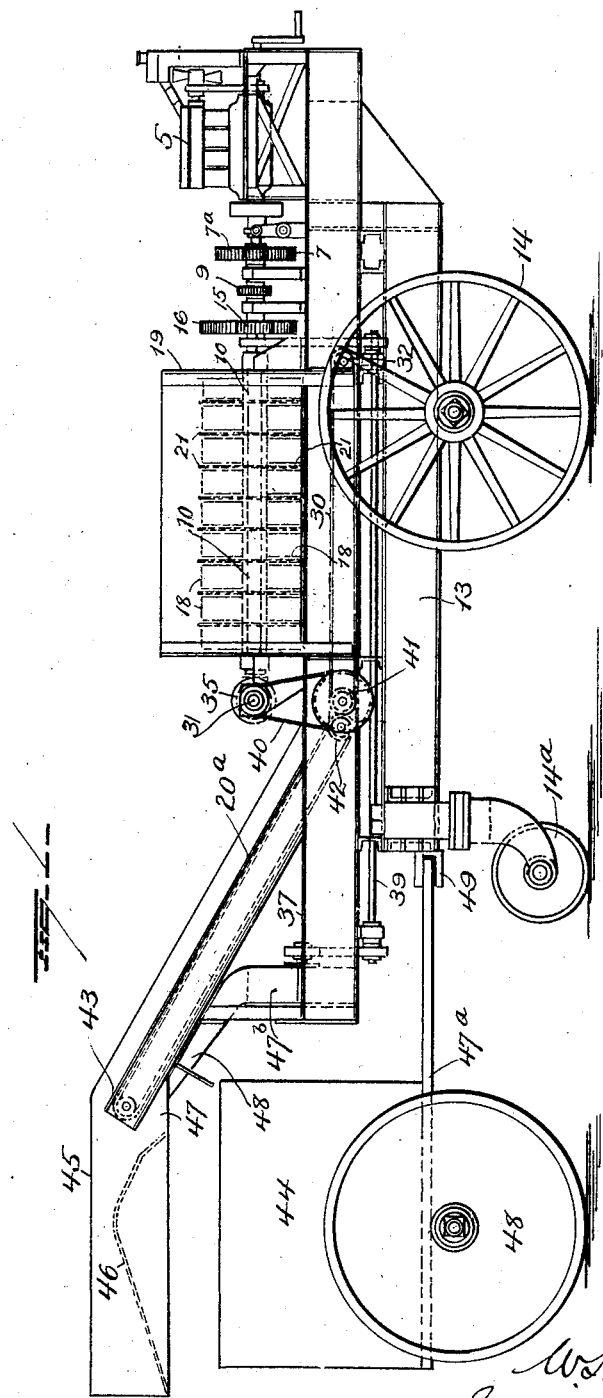

UNITED STATES PATENT OFFICE

WILLIAM HENRY MORGAN, OF ALLIANCE, OHIO, ASSIGNOR, BY MESNE ASSIGNMENTS, TO THE MORGAN HURRYCANE COMPANY, OF NEW YORK, N. Y., A CORPORATION OF FLORIDA

CANE CUTTER

Application filed December 19, 1924. Serial No. 756,992.

This invention relates to improvements in cane cutters for cutting sugar cane stalks into relatively short lengths.

It is often the practice in treating sugar cane stalks for the extraction of the juice therefrom, to cut the stalks into relatively short sections at an early stage in the treatment of the stalks in order to enable the stalks to be more efficiently treated in subsequent operations.

One object of the present invention is to improve the construction and mode of operation of sugar cane cutters of the character above described and to provide an improved construction by which sugar cane stalks may be cut into relatively short lengths in an efficient and reliable manner.

Another object of the invention is to produce a mechanism by which sugar cane stalks may be rapidly and efficiently cut into short lengths and delivered into a suitable receptacle.

A still further object of the invention is to produce an improved mechanism by which sugar cane stalks may be cut into relatively short lengths and trash separated therefrom.

A still further object of the invention is to produce a mechanism by which sugar cane stalks may be readily cut into short lengths in the field.

With these and other objects in view the invention consists in the features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the accompanying drawings;

Figure 1 is a view in side elevation of my improved apparatus;

Figure 2 is a view in plan of the same, the rear end of the main frame and the cut stalk receiving cart being omitted, and Figure 3 is a view in transverse section of the apparatus.

The actuating means consists preferably, of one or more gasoline engines. In the arrangement shown by the drawing, I have preferred to use two relatively small engines which are geared together by gear 6 which is revolved by pinions 7—7ª attached to the respective main shafts of the engines. It might be found desirable to use one large gasoline engine in place of two small ones, and in this case, gear 6 would be connected direct to the single gasoline engine.

The shaft of gear 6, carries a pinion or gear 8 which, meshing with pinion 9, drives shaft 10 which latter carries a series of cutters or saws 11 located in the hopper 12. The parts of the apparatus are supported on a main frame 13 which is mounted to travel on the ground wheels 14.

The shaft 10 is connected by gear 15 with the gear 16 keyed to shaft 17 which carries a series of feeder blades 18, as clearly shown in Figures 2 and 3, the latter adapted to move between the saws or cutters and also across the outer faces of the end saws. The feeder, composed of the blades 18 and its shaft, is also located in the hopper 12 and rotates in a direction opposite that of the cutters, as shown by the arrows in Figure 3 so that the stalks fed into the hopper 12 will be positively carried and forced into contact with the cutters or saws 11 and cut up into short sections, preferably about six inches in length. The axis of the feeder shaft 17 as shown in Fig. 3, is located in the same horizontal plane as the axis of the cutter shaft 10 and the feeder blades 18 will cause the stalks to be delivered to the saws substantially at or above a horizontal plane containing the axis of the saws. This is important in securing a highly efficient cutting action of the saws.

The cutter and feeder shafts are located lengthwise of the main frame, and the hopper 12 and main frame 13 support the endless conveyor frame 19 and endless conveyor 20 both of which are located at right angles to the cutter. The endless conveyor frame 19 is preferably enlarged at its lower end to form a hopper as shown at 21, to receive the stalks as they are thrown onto the conveyor. This conveyor frame is preferably wider than the longest length of stalks so that the latter can be fed into hopper 12 parallel with the axes of the saws and feeder, and the conveyor which may be of any approved form as shown comprises endless belts or chains 20 and fixed platforms 22 located respectively between and at the outer sides of the said belts or chains so as to support the stalks irrespective of their lengths and convey and deposit them into hopper 12. The endless belts or chains 20 are preferably provided at short intervals with the projections 23 which engage the stalks and carry them up to the discharge end of the conveyor. The belts or chains at the upper end of the conveyor pass respectively about pulleys or sprocket wheels mounted on shaft 24 which is driven by a belt 26 passing over a pulley 27 on the feeder shaft 17. At the opposite or lower end of the conveyor 20 the belts or chains pass about pulleys or sprocket wheels mounted on the shaft 28 journalled in the lower end of the conveyor frame 19, as shown in Figure 3.

The main frame 13, is as before stated, mounted on ground wheels 14, the rear two 14$^a$ of which being castor wheels to permit of the free turning of the apparatus, and the entire apparatus is drawn through the cane field by bulls or by tractors of any type connected up with the front end 29 of the apparatus. The base or bottom of the hopper 12 is composed of an endless conveyor of any suitable type which latter is mounted on the shafts 41 and 32, the former of which is driven through a belt 40 as shown in Figure 1 from the cutter shaft 10.

The cutter shaft 10 is provided at its rear end with a bevel pinion 33 meshing with a similar pinion 34 on shaft 31 carried by the hopper 12. This shaft is provided at one end with a pulley 35 which is connected by belt 40 with the shaft 41 which as before stated carries one end of the horizontal conveyor 30 forming the bottom of the hopper 12. Shaft 41 carries a gear or pulley, which is connected, by a gear or belt or sprocket chain with the shaft 42, which supports the lower end of the rearwardly and upwardly projecting elevator conveyor 20$^a$, the upper end of which is carried by the shaft 43. The upper or rear end of the combined elevator and conveyor 20$^a$ projects beyond the main frame 13 so as to discharge the cut stalks into the receptacle or cart 44. This elevator and conveyor 20$^a$ is carried by a frame 45 provided at its upper end with a fixed bottom plate 46 preferably shaped as shown in Fig. 1. As shown in this figure the forward portion of the bottom plate adjacent the conveyor 20$^a$ is inclined upwardly from the rear end of said conveyor and the rear portion of said plate is reversely inclined which latter terminates at the rear of the cart 44. At the front end of the bottom plate 46 is an opening 47 adjacent the rear end of the conveyor 20$^a$, through which the cut stalks and heavier material carried up by conveyor 20 will drop directly from said conveyor into cart 44.

Secured to the main frame 13 is the blower 47$^b$, the discharge outlet 48 of which terminates just below the upper end of conveyor 20$^a$ and is arranged to discharge a blast of air upwardly through the opening 47 against the material carried up by the conveyor, as the said material leaves the conveyor, and blow or force the leaves or lighter trash onto the bottom plate 46 from which it gravitates to the ground in rear of the cart 44, while the cut stalks and heavier material drop through the opening 47 into the cart, thus separating the cut stalks from the leaves and trash.

The cart 44 preferably comprises a frame 47$^a$ mounted on two wheels 48$^a$ and a removable body adapted to be lifted by a crane or other means onto a car or larger cart for transportation to the mill or centrale. The front end of the frame 47$^a$ of the cart is detachably connected at 49 to the main frame 13 of the apparatus, by a coupling pin, whereby a filled cart can be readily removed and an empty one attached.

The material to be cut is fed by hand into the hopper 21 and is carried by the fingers or projections 23 on the conveyor 20 up into the hopper 12 and is dumped onto the feeder. The latter carries it in contact with the cutters or saws which cut the stalks into short lengths which drop onto the conveyor 30 and are carried by the latter to conveyor 20$^a$, which as before explained carries the material up and discharge the same above the cart 44. The air blast from blower 47$^b$ strikes the material as it leaves the conveyor, but is not sufficient to carry off anything but the lighter parts which are blown over inclined plate or bottom 46 of the frame 45 and fall onto the ground at the rear of the apparatus, while the cut stalks drop into the cart 44. When a cart is filled it can be uncoupled and an empty cart substituted, so that but comparatively little time is lost in changing carts. The apparatus is supposed to follow a harvester, but it may be used in a field where the cane is cut by hand in the ordinary manner, or the ground wheels may be omitted and the apparatus be placed on a stationary base.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention, what I claim as new and desire to secure by Letters Patent is:—

1. In a stalk cutter, the combination of a frame, a hopper on said frame, stalk cutting apparatus within said hopper, means for delivering the stalks to the cutter, a rear end conveyor, a trash guiding device at the rear of the rear end of said conveyor and a blower adapted to discharge an air blast between the discharge end of the rear conveyor and the trash guiding device.

2. In a stalk cutter, the combination of a frame, a hopper on said frame, a cutter in said hopper, a side conveyor for delivering the stalks to the hopper, a rear end conveyor for discharging the cut stalks and trash, a blower for discharging an air blast against the material as it leaves the rear end conveyor and a receptacle connected to the machine frame for receiving the cut stalks.

3. In a stalk cutter, the combination of a vehicle frame, a hopper on said frame, a cutter in said hopper, a side conveyor for delivering the stalks to the hopper, a rear end conveyor for discharging the cut stalks and trash, a blower for directing an air blast against the material discharged from the rear end conveyor, a receptacle connected to the vehicle frame in a position to receive the cut stalks and an engine for actuating the cutter and conveyors.

4. The combination with a vehicle mounted to travel and provided with a hopper, a conveyor projecting at one side of said vehicle and adapted to elevate the previously harvested stalks, up and over the vehicle and discharge it into the hopper, a cutter within the hopper and in a position to engage the stalks and cut them into short lengths, a conveyor on said vehicle for conveying the cut stalks in the direction of the length of the vehicle, and a detachable wheeled cart located under the discharge end of said latter conveyor and adapted to receive the cut stalks, the said cart being detachably connected with the vehicle and so located that it can be disconnected therefrom and an empty cart substituted without removing or adjusting any parts of the vehicle or the parts carried by the latter.

5. The combination with a vehicle mounted to travel and provided with a hopper, a conveyor projecting at one side of said vehicle and terminating over the hopper so that the harvested cane may be fed to the conveyor and deposited directly into the hopper, a cutter shaft extending lengthwise of the vehicle, a series of parallel disk shaped cutters on said shaft and adapted to cut the full length stalks into short sections, and a wheeled cart detachably connected with the vehicle and in a position to receive the cut stalks, means for delivering the stalks cut by the cutters to the cart, the said vehicle and cart being so constructed that a filled cart can be detached and an empty cart substituted without removing or adjusting any parts of the vehicle.

6. The combination of a vehicle mounted to travel and provided with a hopper, a conveyor at right angles to said vehicle and projecting at one end over one side of the vehicle, with its other end terminating over said hopper so that the cut or harvested full length stalks can be readily gathered up, deposited on the conveyor and transferred by the latter to the hopper in the direction of the length of the latter, a cutter carrying shaft extending lengthwise of the vehicle and provided with a series of spaced cutters for cutting the full length stalks into short sections, a feeder in the hopper for forcibly forcing the stalks against the cutters and for removing the cut sections from between the cutters, and a detachable cart mounted on wheels independently of the vehicle and connected with the latter in a position to receive the cut stalks, means for delivering the stalks cut by the cutters to the cart, the said vehicle being so constructed that the cart can rest thereunder and be replaced by an empty cart without adjusting or rearranging any parts of the vehicle.

7. The combination of a frame, a hopper thereon, an endless conveyor projecting over one side of the frame, a hopper on the frame and adapted to receive the full length stalks deposited to the conveyor, a hopper on the frame arranged with its longitudinal axis extending in the direction of the length of the frame, a cutter shaft in said hopper, a series of cutters on said cutter shaft and arranged at right angles to the frame, a feeder within the hopper and adapted to force the full length stalks between and through the cutters, and a detachable wheeled receptacle adapted to be connected up with the frame in a position to receive the cut stalks from the hopper, the said frame being so constructed and the wheeled receptacle so located that the latter can be removed and an empty one attached without adjusting or disconnecting any parts of the frame, means for delivering the stalks cut by the cutters to the wheeled receptacle, and means carried by the frame for actuating the conveyor, cutter and feeder.

8. In a cane stalk cutter, the combination of a frame mounted on wheels, a hopper on said frame, an inclined conveyor projecting over one side of the frame and terminating at its upper end above the hopper, cutters for cutting the stalks delivered to the hopper, a conveyor constituting the bottom of the hopper for conveying the cut material rearwardly and a wheeled cart detachably secured to the frame in a position under the rear end of said latter conveyor, the frame of the apparatus being constructed to receive the cart and form a top housing for the latter.

9. In a stalk cutter, the combination of a vehicle frame mounted on wheels, a hopper on said frame, a series of cutters in said hopper for cutting the full size stalks into small sections, a side conveyor extending over one side of the frame and terminating at its other end over the hopper, a conveyor extending lengthwise the frame for conveying the cut stalks rearwardly and a wheeled cart attached to the frame and located under the rear end of the lengthwise conveyor.

10. In a stalk cutter, the combination of a frame mounted on wheels, a hopper on said frame, cutters located to receive the full length stalks and cut them into smaller lengths, an inclined conveyor projecting over one side of said frame with its discharge end over the hopper, the said side conveyor having its long axis at right angles to the long axis of the frame and hopper, a conveyor for discharging the short length stalks and trash from the hopper, and air blast apparatus adjacent the discharge end of the conveyor for separating the light trash from the cut stalks.

11. In a cane stalk cutter, the combination of a series of spaced rotary cutting devices arranged to rotate in substantially parallel planes for cutting the cane stalks into relatively short sections, means for delivering the cane stalks to said cutting devices in positions transverse to the planes of rotation of said devices, moving conveying means for receiving the cut sections from said cutting devices and conveying the same in the general direction in which the axes of said cutting devices extend, and means for delivering an air blast to the cut stalks in a direction transverse to the direction of the movement of the stalks as the stalks are discharged from said conveying means.

In testimony whereof, I have signed this specification.

WILLIAM HENRY MORGAN.